United States Patent
Lee et al.

(10) Patent No.: US 8,003,269 B2
(45) Date of Patent: Aug. 23, 2011

(54) FUEL REFORMING APPARATUS AND ITS METHOD OF DRIVING AND FUEL CELL SYSTEM INCLUDING THE APPARATUS

(75) Inventors: Sung-Chul Lee, Suwon-si (KR);
Ju-Yong Kim, Suwon-si (KR);
Yong-Kul Lee, Suwon-si (KR);
Man-Seok Han, Suwon-si (KR);
Jun-Sik Kim, Suwon-si (KR); Jin-Goo Ahn, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 769 days.

(21) Appl. No.: 12/068,227

(22) Filed: Feb. 4, 2008

(65) Prior Publication Data
US 2008/0268301 A1   Oct. 30, 2008

(30) Foreign Application Priority Data
Apr. 24, 2007   (KR) .................. 10-2007-0039858

(51) Int. Cl.
*H01M 8/06* (2006.01)
*B01J 19/00* (2006.01)
(52) U.S. Cl. .............. 429/423; 429/441; 422/204
(58) Field of Classification Search .......... 429/423, 429/441; 422/204; 431/264
See application file for complete search history.

(56) References Cited

U.S. PATENT DOCUMENTS

| | | | |
|---|---|---|---|
| 4,946,384 A * | 8/1990 | London | 431/264 X |
| 5,295,818 A * | 3/1994 | Robinson | 431/75 |
| 2003/0000145 A1 | 1/2003 | Salemi et al. | |
| 2004/0154222 A1 | 8/2004 | Burch et al. | |
| 2004/0187386 A1 | 9/2004 | Wangerow et al. | |
| 2005/0061495 A1 | 3/2005 | Schubert et al. | |
| 2006/0008683 A1 | 1/2006 | Kim et al. | |
| 2007/0113476 A1 * | 5/2007 | Thomas et al. | 48/198.7 |

FOREIGN PATENT DOCUMENTS

| | | |
|---|---|---|
| EP | 1787949 | 5/2007 |
| JP | 01-122902 | 5/1989 |

(Continued)

OTHER PUBLICATIONS

European Search Report dated Oct. 7, 2008, of corresponding European Application No. 08101696.6.

(Continued)

*Primary Examiner* — Stephen J. Kalafut
(74) *Attorney, Agent, or Firm* — Robert E. Bushnell, Esq.

(57) ABSTRACT

A fuel reforming apparatus includes an oxidation reaction unit in which an oxidation catalyst is formed, a reforming reaction unit in which a reforming catalyst is formed, and an ignition unit for igniting a hydrocarbon-containing fuel and an oxidant and preheating the oxidation catalyst in an early driving stage. The oxidation reaction unit has a first section and a second section respectively formed opposite to each other with the oxidation catalyst interposed therebetween and forms a stream of the fuel and the oxidant flowing to the second section through the oxidation catalyst from the first section, the ignition unit being located in the second section.

25 Claims, 9 Drawing Sheets

FOREIGN PATENT DOCUMENTS

| | | |
|---|---|---|
| JP | 03-028620 | 2/1991 |
| JP | 10-194702 | 7/1998 |
| JP | 2001-155756 | 6/2001 |
| JP | 2002-187705 | 7/2002 |
| JP | 2003-252604 | 9/2003 |
| JP | 2004-196600 | 7/2004 |
| JP | 2004-288434 | 10/2004 |
| JP | 2005-213133 | 8/2005 |
| JP | 2005-239525 | 9/2005 |
| JP | 2006-019268 | 1/2006 |
| JP | 2006-093091 | 4/2006 |
| KR | 10-2005-0116444 | 12/2005 |
| KR | 10-2006-0102132 | 9/2006 |

OTHER PUBLICATIONS

Japanese Office Action issued by Japanese Patent Office on Apr. 5, 2011 corresponding Korean Patent Application No. 10-2007-0039858 and Request for Entry of the Accompanying Office Action attached herewith.

* cited by examiner

FUEL REFORMING APPARATUS AND ITS METHOD OF DRIVING AND FUEL CELL SYSTEM INCLUDING THE APPARATUS

CLAIM OF PRIORITY

This application makes reference to, incorporates the same herein, and claims all benefits accruing under 35 U.S.C. §119 from an application for APPARATUS FOR REFORMING FUEL DRIVING METHOD OF THE SAME earlier filed in the Korean Intellectual Property Office on 24 Apr. 2007 and there duly assigned Serial No. 10-2007-0039858.

BACKGROUND OF THE INVENTION

1. Field of the Invention

The present invention relates to a reforming apparatus and its method of driving and a fuel cell system including the reforming apparatus. More particularly, the present invention relates to an oxidation reactor that generates thermal energy from an oxidation reaction of a fuel using a catalyst.

2. Description of the Related Art

As is well known, a fuel cell is an electricity generating system for generating electrical energy using a fuel and an oxidant gas. The fuel cell may be either a polymer electrolyte membrane fuel cell or a direct oxidation membrane fuel cell.

The polymer electrolyte membrane fuel cell receives a reformate gas generated in a reforming apparatus and an oxidant gas that is different from the reformate gas, and generates electrical energy in an oxidation reaction of hydrogen contained in the reformate gas and an electrochemical reaction of oxygen contained in the oxidant gas.

The reforming apparatus has a heater that generates thermal energy by combustion of a fuel, and a reforming reactor that generates a reformate gas in a reforming reaction of the fuel using the thermal energy.

The heater can be either a burner-type heater or an oxidation-type heater. The burner-type heater generates thermal energy by direct combustion of a fuel containing a liquid fuel, such as methanol and ethanol, and a gas fuel, such as LPG and LNG, and the oxidation-type heater generates thermal energy from an oxidation reaction of the fuel.

The burner-type heater has drawbacks of difficulty in driving and reducing a life-cycle of the entire reforming apparatus because a flame causes a hot-spot phenomenon of the burner. Thus, a sufficient space for the burner is required for eliminating the hot-spot phenomenon, and accordingly, the volume of the entire apparatus is increased.

The oxidation-type heater includes an oxidation reactor that generates thermal energy by using an oxidation method of the fuel. However, particularly when using the gas fuel, the oxidation reactor cannot generate the oxidation reaction of the gas fuel by the oxidation catalyst at room temperature, and therefore the oxidation catalyst needs to be preheated to a predetermined temperature.

Conventionally, a preheating apparatus for directly or indirectly heating the oxidation catalyst using an electric heater, such as a heat wire, or directly heating the oxidation catalyst using a flame, such as a burner, has been disclosed in order to solve the above problems.

However, the conventional oxidation reactor using the electric heater requires an increased number of parts, and consumes power from a fuel cell.

In addition, the conventional oxidation reactor using the burner is difficult to drive so that the oxidation catalyst is sintered or damaged due to the flame.

SUMMARY OF THE INVENTION

The present invention has been made in an effort to provide a fuel reforming apparatus having advantages of simply diffusing a flame to an oxidation catalyst in an early driving stage of the fuel reforming apparatus without using a preheating apparatus, a driving method thereof, and a fuel cell system including the apparatus.

An exemplary fuel reforming apparatus according to one embodiment of the present invention includes an oxidation reaction unit, a reforming reaction unit, and an ignition unit. The oxidation reaction unit has an oxidation catalyst formed therein. The reforming reaction unit has a reforming catalyst formed therein. The ignition unit ignites a hydrocarbon-containing fuel and an oxidant and preheats the oxidation catalyst. The oxidation reaction unit has a first section and a second section respectively formed opposite to each other with the oxidation catalyst interposed therebetween, and forms a stream of the fuel and the oxidant flowing to the second section through the oxidation catalyst from the first section. The ignition unit is located in the second section.

The ignition unit may ignite the fuel and the oxidant by using an electrical spark in the second section.

The oxidation reaction unit may generate thermal energy from an oxidation reaction of the fuel and the oxidant by the oxidation catalyst.

The reforming reaction unit may receive the thermal energy and generate a reformate gas containing hydrogen from a reforming reaction of the fuel and water vapor by the reforming catalyst.

An exemplary fuel reforming apparatus according to another embodiment of the present invention includes a reforming reaction unit, an oxidation reaction unit, and an ignition unit. The reforming reaction unit has a first catalyst and a reforming catalyst formed in the first body, and generates a reformate gas containing hydrogen from a reforming reaction of a hydrocarbon-containing fuel and water vapor by the reforming catalyst. The oxidation reaction unit has a second body surrounding the first body and an oxidation catalyst formed between the first body and the second body, generates thermal energy from an oxidation reaction of the hydrocarbon-containing fuel and an oxidant by the oxidation catalyst, and supplies the thermal energy to the reforming reaction unit. The ignition unit forms a flame to preheat the oxidation catalyst to a reaction initiation temperature.

The oxidation reaction unit has a first section and a second section respectively connected to lateral ends of the second body and connected to an area formed between the first and second bodies, forms a stream of the fuel and the oxidant flowing to the second section from the first section through the oxidation catalyst, and diffuses the flame in a direction that is opposite to the direction of the stream of the fuel and the oxidant. The ignition unit is located in the second section.

The first body and the second body may be respectively shaped as a pipe, and the first body may be located in the second body.

The reforming catalyst and the oxidation catalyst may be respectively formed of a monolithic supporting member on which a catalyst material is coated.

The reforming catalyst and the oxidation catalyst may be formed of pellet-type unit catalysts.

The fuel reforming apparatus further includes a vaporizer having a pipe-type third body surrounding the second body, and vaporizes water with the thermal energy received from the oxidation reaction unit.

The vaporizer includes a third section and a pass member. The third section is formed between the second body and the third body by the third body and is connected to the second section. The pass member is formed in a coil shape along an exterior surface direction of the second body in the third section and passes the water.

The fuel reforming apparatus may further include a fourth section separately formed between the second section and the vaporizer and compounding the fuel and water vapor in the fourth section.

The compounding unit may include a fuel inlet port for injecting the fuel to the fourth section.

The pass member may be connected to the fourth section.

The fuel reforming apparatus may further include a channel unit formed between the vaporizer and the oxidation reaction unit and supplying the fuel and water vapor compounded by the compounding unit to the reforming reaction unit.

The channel unit may include a spiral groove formed on an exterior surface of the second body and a spiral path formed as a pipe-type fourth body surrounding the exterior surface of the second body. The path may be connected to the compounding unit and the reforming reaction unit.

The fuel reforming apparatus may further includes a combustion gas circulation unit having a pipe-type fifth body surrounding the third body and circulating a combustion gas of the fuel and the oxidant past the third section.

The combustion gas circulation unit may be formed between the third body and the fifth body by the fifth body and may be formed as a fifth section connected to the third section. The combustion gas circulation unit may include a combustion gas outlet port for emitting the combustion gas.

The fuel reforming apparatus may further include a carbon monoxide reducing unit having a pipe-type sixth body surrounding the fifth body and reducing the concentration of carbon monoxide in the reformate gas. The combustion gas circulation unit may supply thermal energy of the combustion gas to the carbon monoxide reducing unit.

The carbon monoxide reducing unit may include a sixth section formed between the fifth body and the sixth body by the sixth body, and a Water Gas Shifting (WGS) catalyst formed in the sixth section and promoting a WGS reaction of the carbon monoxide.

The reforming reaction unit may include a first reformate gas outlet port for emitting the reformate gas, and the first reformate gas outlet port may be connected to the sixth section.

The carbon monoxide reducing unit may include a second reformate gas outlet port for emitting the reformate gas having the carbon monoxide reduced in concentration.

The fuel reforming apparatus may use a liquefied gas that is in a gaseous state at room temperature as the hydrocarbon-containing fuel. At least one of methane, ethane, propane, and butane may be selected as a main component of the fuel.

A method of driving of a fuel reforming apparatus according to another embodiment of the present invention includes: providing an oxidation reaction unit, a reforming reaction unit, and an ignition unit; activating the ignition unit; forming a flame by igniting the fuel and the oxidant in the second section using the ignition unit; and introducing the flame in a direction that is opposite to the stream direction of the fuel and the oxidant.

The driving method may include turning off the ignition unit when the oxidation catalyst has been preheated to a temperature of over 250° C.

A temperature of the oxidation reaction unit may be maintained at 650 to 700° C.

The oxidation reaction unit may generate thermal energy from an oxidation reaction of the fuel and the oxidant by the oxidation catalyst.

The temperature of the reforming reaction unit may be maintained at 700 to 750° C., and the reforming reaction unit may generate a reformate gas from a reforming reaction of the fuel and water vapor.

A fuel cell system having the fuel reforming apparatus according to the above exemplary embodiment of the present invention, includes a stack generating electric energy through a reaction between hydrogen and oxygen, and the fuel reforming apparatus generates hydrogen from fuel through a catalytic reaction of the fuel using thermal energy and supplies the generated hydrogen to the stack.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, the present invention is described more fully with reference to the accompanying drawings, in which exemplary embodiments of the present invention are shown. As those skilled in the art would realize, the described embodiments may be modified in various different ways, all without departing from the spirit or scope of the present invention.

Figure 1:
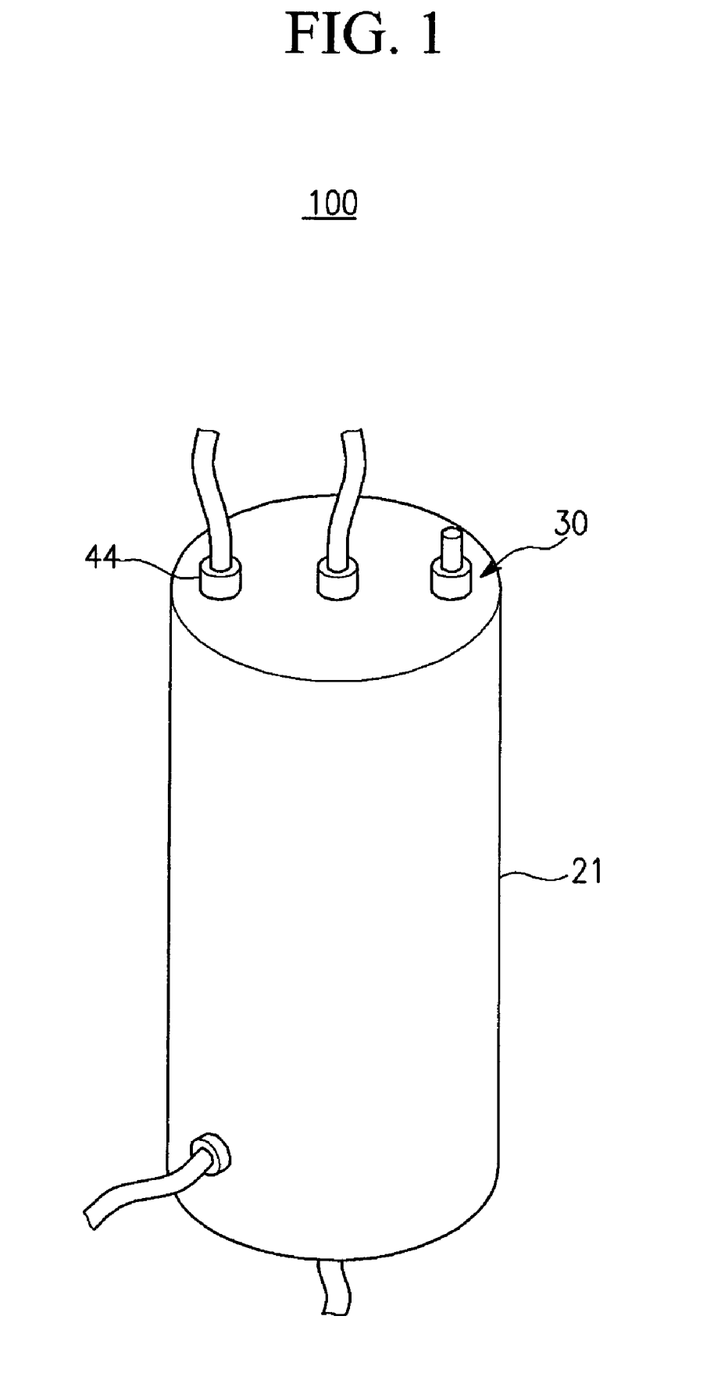
FIG. 1 is a perspective view of a fuel reforming apparatus according to a first exemplary embodiment of the present invention.

FIG. 1 is a perspective view of a fuel reforming apparatus according to a first exemplary embodiment of the present invention.

Referring to FIG. 1, a fuel reforming apparatus 100 according to the first exemplary embodiment of the present invention includes a fuel processor that reforms a fuel and generates a reformate gas that is rich in hydrogen.

The fuel reforming apparatus 100 supplies a reformate gas to a polymer electrolyte membrane fuel cell, and the polymer electrolyte membrane fuel cell generates electrical energy by using an oxidation reaction of the reformate gas and a reduction reaction of an oxidant (e.g., air).

In this case, the fuel is partially liquefied and compressed in a predetermined container, and may include a liquefied gas that exists as a gas at room temperature. The fuel may be provided as a liquid gas, such as a hydrocarbon family gas (e.g., methane, ethane, propane, and butane).

Figure 2:
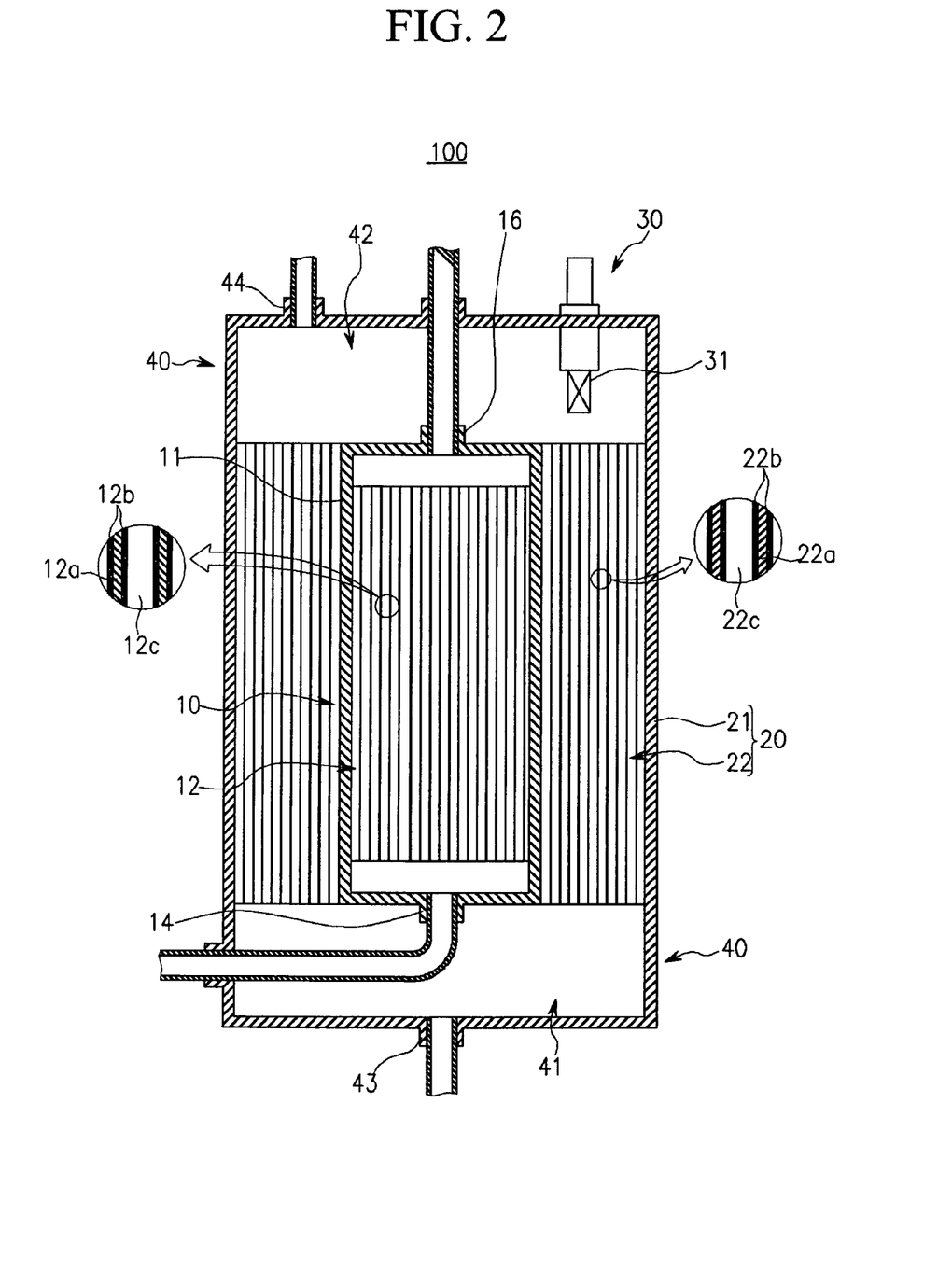
FIG. 2 is a cross-sectional view of FIG. 1.

FIG. 2 is a cross-section view of FIG. 1.

Referring to FIG. 1 and FIG. 2, the fuel reforming apparatus 100 includes a reforming reaction unit 10 that generates a reformate gas in a reforming reaction of the fuel and water vapor, and an oxidation reaction unit 20 that generates thermal energy in an oxidation reaction of the fuel and an oxidant.

The reforming reaction unit 10 receives the thermal energy from the oxidation reaction unit 20 and carries out a Steam Reforming (SR) reaction of the fuel using a catalyst.

Such a reforming reaction unit 10 includes a first body 11 and a reforming catalyst 12 arranged inside the first body 11.

The first body 11 has a channel, and is a cylindrical pipe having its lateral ends sealed.

The reforming catalyst 12 promotes a water vapor reforming reaction of the fuel and generates a reformate gas containing hydrogen. The reforming catalyst 12 includes a monolith-type first catalyst molding frame 12a and a first catalyst layer 12b coated on the first catalyst molding frame 12a.

The first catalyst molding frame 12a is arranged at an inner space of the first body 11, and is manufactured as an integral module by extrusion molding of a ceramic or metal material. The first catalyst molding frame 12a forms a plurality of honeycomb-shaped first paths 12c that are parallel to a direction of flow of a reactant.

The first catalyst layer 12b is coated on an inner wall of the first path 12c of the first catalyst molding frame 12a. Such a first catalyst layer 12b is made of a typical catalyst material that can promote the vapor reforming reaction of the fuel, for example, copper (Cu), nickel (Ni), or platinum (Pt).

In addition, the reforming reaction unit 10 further includes a first inlet port 14 arranged at a first end of the first body 11 and a first outlet port 16 arranged at a second end of the first body 11.

The fuel and air is injected into the first body 11 through the first inlet port 14, and the reformate gas generated in the vapor reforming reaction of the fuel by the reforming catalyst 12 is output through the first output port 16.

Water vapor can be provided from a water vaporizer (not shown), and the water vapor can be injected into the first body 11 together with the fuel through the first inlet port 14.

In the present exemplary embodiment, the oxidation reaction unit 20 generates thermal energy in an oxidation reaction of the fuel and the oxidant by the catalyst, and provides the thermal energy to the reforming reaction unit 10.

The oxidation reaction unit 20 includes a second body 21 surrounding the first body 11, and an oxidation catalyst 22 formed between the first body 11 and the second body 21.

The second body 21 is a cylindrical pipe having a cross-sectional line area that is larger than the first body 11, and the lateral ends of the second body 21 are substantially open. The first body 11 is arranged in an internal center direction (co-axial direction) of the second body 21 so that an exterior surface of the first body 11 is constantly spaced from an interior surface of the second body 21.

The oxidation catalyst 22 promotes thermal energy by promoting an oxidation reaction of the fuel and the oxidant. The oxidation catalyst 22 includes a monolith-type second catalyst molding frame 22a and a second catalyst layer 22b coated on the second catalyst molding frame 22a.

The second catalyst molding frame 22a is disposed in an area between the first body 11 and the second body 21, and is manufactured as an integral module by extrusion molding of a ceramic or metal material. The second catalyst molding frame 22a forms a plurality of honeycomb-shaped second paths 22c that are parallel to a direction of flow of a reactant.

The second catalyst layer 22b is formed on an inner wall of the second path 22c of the second catalyst molding frame 22a. The second catalyst layer 22b is made of a typical catalyst material, for example, platinum (Pt) or ruthenium (Ru), that can promote an oxidation reaction of the fuel and the oxidant.

In an initial driving stage of the fuel reforming apparatus 100, the oxidation reaction of the fuel and the oxidant cannot be generated by the oxidation catalyst 22 at room temperature, and therefore a thermal energy of over 250° C. needs to be provided to the oxidation catalyst 22 in order to initiate the oxidation reaction of the fuel and the oxidant.

Therefore, the fuel reforming apparatus 100 according to the present exemplary embodiment includes an ignition unit 30 and a stream forming unit 40.

In the present exemplary embodiment, the ignition unit 30 ignites the fuel and the oxidant at the initial driving state and preheats the oxidation catalyst 22 to a reaction initiation temperature.

The ignition unit 30 is arranged in the stream forming unit 40, and is a typical ignition device that generates a flame using an electrical spark. The ignition unit 30 includes an electrical spark generator 31 that received power and generates an electrical spark.

The typical ignition device is well known to a person skilled in the art, and therefore no further description thereof has been provided.

In the present exemplary embodiment, the stream forming unit 40 forms a stream of the fuel and the oxidant so that the stream can pass the oxidation catalyst 22 and be ignited by the ignition unit 30.

In addition, the stream forming unit 40 controls the flame and the thermal energy generated when the fuel and oxidant are ignited by the ignition unit 30 to flow to a direction that is opposite to the direction of the stream of the fuel and the oxidant.

The stream forming unit 40 includes a first section 41 formed as a space at a first end of second body 21 and a second section 42 formed as a space at a second end of the second body 21.

The first section 41 is integrally connected to a lower portion of the second body 21. The first section 41 forms an internal space that is in the area between the first body 11 and the second body 21.

A second inlet port 43 is formed in the first section 41 so as to inject the fuel and the oxidant to the internal space.

The second section 42 is integrally connected to an upper portion of the second body 21. The second section 42 forms an internal space that is in the area between the first body 11 and the second body 21.

The ignition unit 30 is arranged in the internal space of the second section 42. The second section 42 includes a second outlet port 44 for emitting a combustion gas of the fuel and the oxidant ignited by the ignition unit 30.

Hereinafter, a method of driving the fuel reforming apparatus according to an exemplary embodiment of the present invention is described in further detail.

Figure 3:
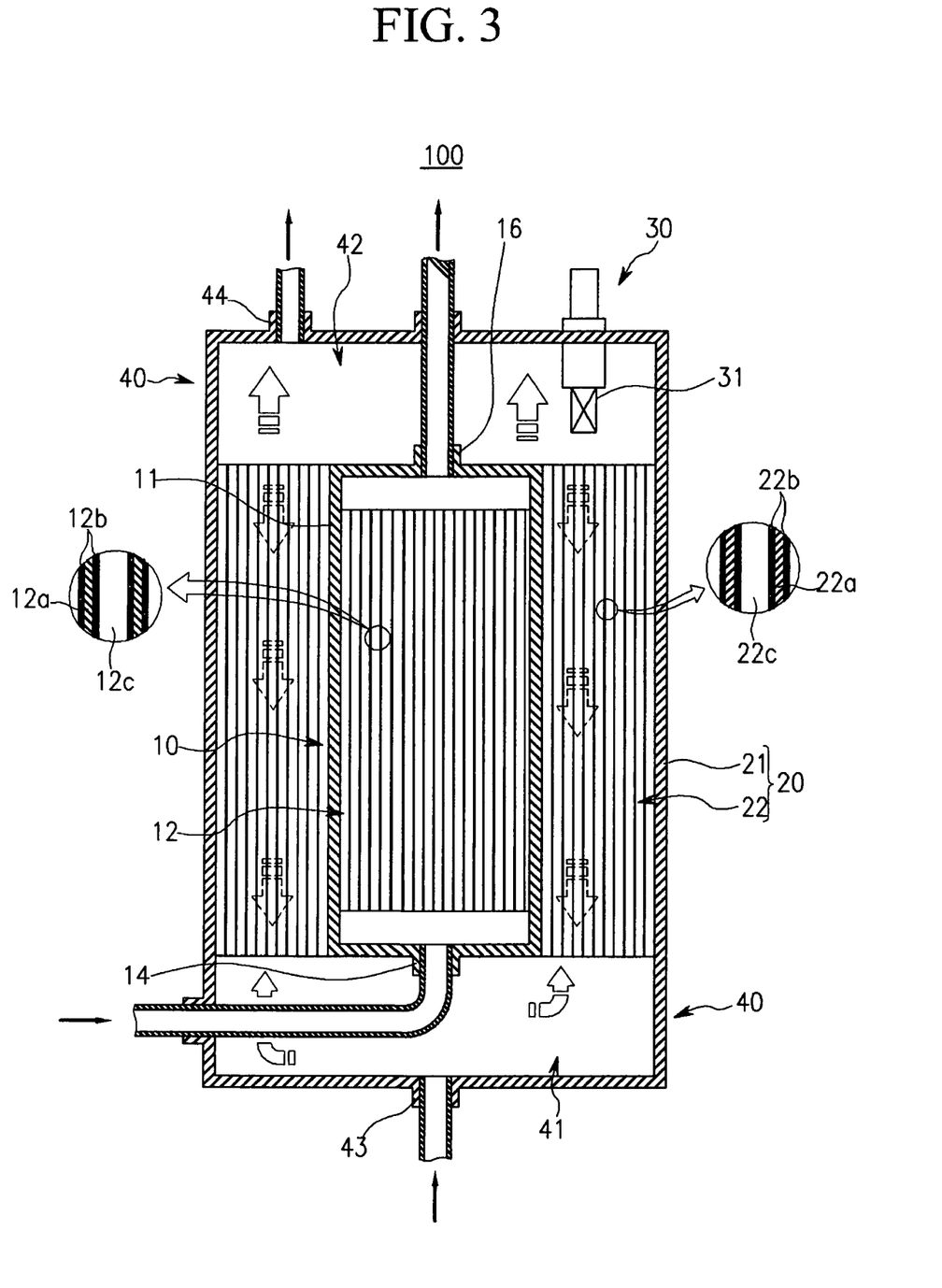
FIG. 3 is a cross-sectional view of a fuel reforming apparatus for describing a driving method thereof according to an exemplary embodiment of the present invention.

FIG. 3 is a cross-sectional view of the fuel reforming apparatus according to the exemplary embodiment of the present invention.

Referring to FIG. 3, during initial driving of the reforming apparatus 100, the fuel and the oxidant are injected into the internal space of the first section 41 through the second inlet port 43.

Since the first section and the second section are connected with the area between the first body 11 and the second body 21, the fuel and the oxidant pass through the oxidation catalyst 22 from the first section 41 and flow to the second section 42, as shown by the solid arrow line of the drawing.

That is, the fuel and the oxidant flow from the internal space of the first section 41 to the internal space of the second section 42 through the second paths 22c of the oxidation catalyst 22.

The fuel and the oxidant maybe simultaneously injected to the internal space of the first section 41 as described above, or may be separately injected with a given time gap.

In the above processes, the ignition unit 30 generates an electrical spark and ignites the fuel and the oxidant introduced into the internal space of the second section 42.

The flame generated when the fuel and the oxidant are ignited by the ignition unit 30 heats the upper portion of the oxidation catalyst 22. That is, the flame heats an end portion of the oxidation catalyst 22 at the second section 42. Therefore, the temperature of the upper portion of the oxidation catalyst 22 is rapidly increased by the flame.

Then, the flame moves in a direction that is opposite to the stream direction of the fuel and the oxidant through the second paths 22c of the oxidation catalyst 22 as shown by the dotted-line arrow of the drawing. Therefore, the thermal energy applied to the upper portion of the oxidation catalyst 22 moves to the lower portion of the oxidation catalyst 22.

Accordingly, the flame and the thermal energy are diffused in a direction of the first section 41 from the second section 42 and heats the overall oxidant catalyst 22 within a short period of time.

Through the above processes, the oxidation catalyst 22 is heated to the reaction initiation temperature so as to initiate the oxidation reaction of the fuel and the oxidant. Preferably, the oxidant catalyst is heated to over 250° C. In this case, the combustion gas of the fuel and the oxidant are emitted through the second outlet port 44.

The reforming apparatus 100 is normally driven when the temperature of the oxidation catalyst 22 is over 250° C., and at the ignition unit 30 stops operation. The fuel and the oxidant are being continuously injected into the internal space of the first section 41 through the second inlet port 43.

In the oxidation reaction unit 20, thermal energy of 650 to 700° C. is generated when the oxidation reaction of the fuel and the oxidant is substantially performed by the oxidation catalyst 22. The thermal energy is delivered to the reforming catalyst 12 of the reforming reaction unit 10 through the first body 11. Accordingly, the temperature of the reforming reaction unit 10 can be maintained at a range for the water vapor reforming reaction, that is, 700 to 750° C.

Subsequently, the fuel and water vapor are injected into the inside of the first body 11 through the first inlet port 14 of the reforming reaction unit 10. Then, the reforming reaction unit 10 generates a reformate gas containing hydrogen from a water vapor reforming reaction (endothermic reaction) of the fuel by the reforming catalyst 12.

The reformate gas is emitted through the first outlet port 16 and then suppled to a fuel cell. The fuel cell generates electrical energy from an oxidation reaction of the hydrogen contained in the reformate gas and a reduction reaction of an additionally-provided oxidant.

Figure 4:
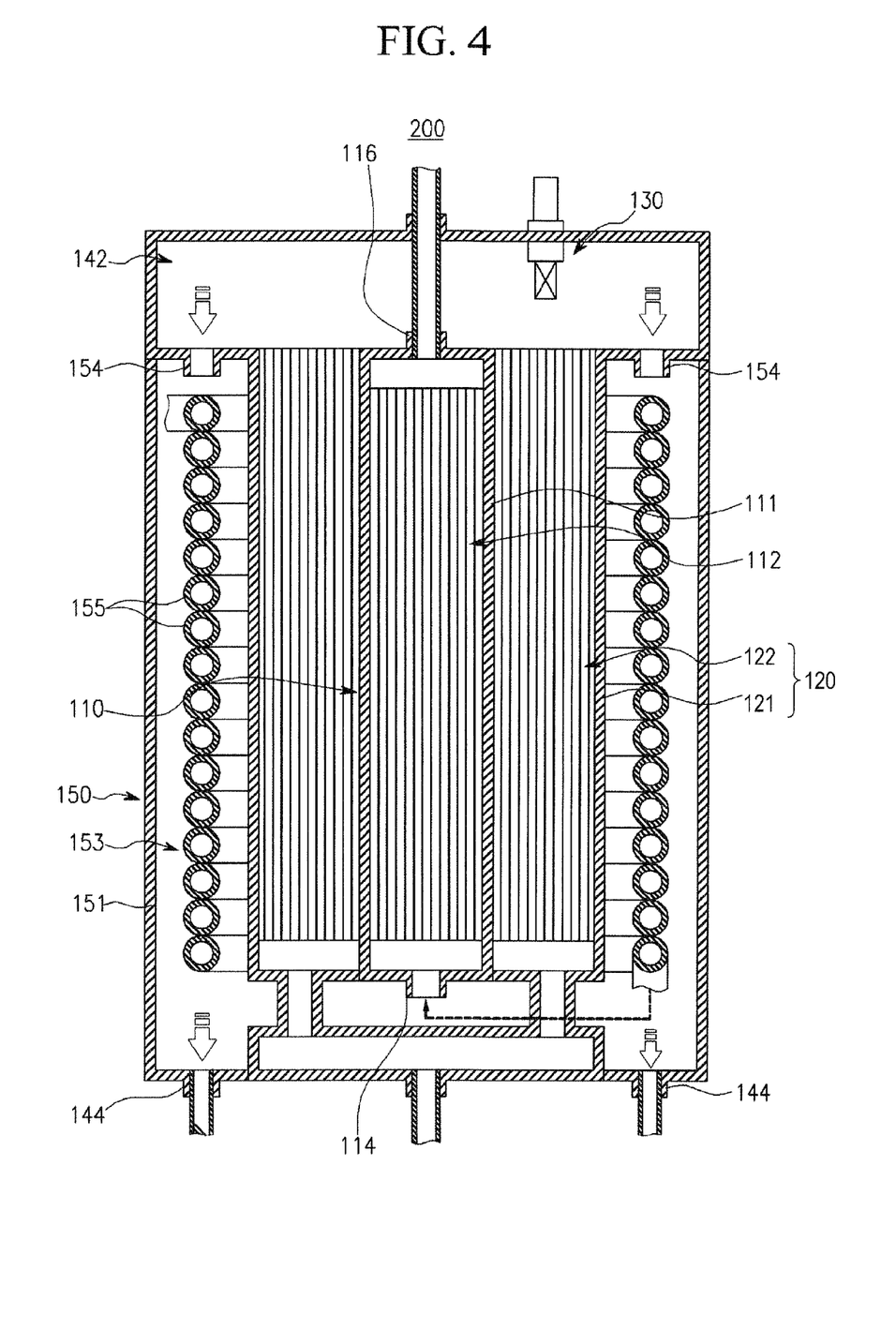
FIG. 4 is a cross-sectional view of a fuel reforming apparatus according to a second exemplary embodiment of the present invention.

FIG. 4 is a cross-sectional view of a fuel reforming apparatus according to a second exemplary embodiment of the present invention.

Referring to FIG. 4, a fuel reforming apparatus 200 according to the second exemplary embodiment of the present invention is basically similar to the fuel reforming apparatus 100 of the first exemplary embodiment of the present invention, but further includes a vaporizer 150 that receives thermal energy generated by an oxidation reaction unit 120 and vaporizes water using the thermal energy.

In the second exemplary embodiment, the vaporizer 150 is arranged on an outer edge of the oxidation reaction unit 120. The vaporizer 150 includes a third body 151 surrounding a second body 121, a third section 153 arranged between the second body 121 and the third body 151, and a pass member 155 arranged in the third section 153.

The third body 151 is a cylindrically-shaped pipe having a larger line area than the second body 121. The second body 121 is arranged in an internal center direction (coaxial direction) of the third body 151 so as to maintain a constant distance between an exterior surface of the second body 121 and an interior surface of the third body 151.

The third section 153 is a closed space arranged between the second body 121 and the third body 151.

The third section 153 is connected to the second section 142. The third body 151 includes a plurality of vent holes 154 in a first end (upper end in FIG. 4) thereof for connecting the second section 142 and the third body 151 therethrough.

A flame generated by combustion of the fuel and the oxidant by an ignition unit 130 when the fuel reforming apparatus 200 is initially driven is partially injected into the third section 153 from the second section 142 through the vent holes 154, and thermal energy from an oxidation reaction of the fuel and the oxidant by an oxidation catalyst 122 when the fuel reforming apparatus 200 is normally driven is also supplied to the third section 153.

A combustion gas generated when the fuel and the oxidant are ignited by the ignition unit 130 or the oxidant catalyst 122 is injected into the third section 153 from the second section 142 through the vent holes 154. A plurality of outlet ports 144 are formed on a second end of the third body 151 so as to emit the combustion gas injected into the third section 153 from the second section 142.

The pass member 155 is a coil shape that is wound along an exterior surface direction of the second body 121, and forms a path for water.

The pass member 155 is provided to vaporize water with thermal energy applied to the third section 153, and is a pipe made of a metal material having a high thermal conductivity. A first end of the pass member 155 is connected to a water supply unit (not shown), and a second end of the pass member 155 is connected to a first injection port 114 of a reforming reaction unit 110 as shown by the dotted line arrow of FIG. 4.

The pass member 155 is wound along the exterior surface of the second body 121, and the pass member 155 is spaced from the exterior surface of the second body 121. The thermal energy supplied to the third section 153 can be easily delivered through the pass member 155.

Water can be vaporized by the vaporizer 150 formed on an outer side of the oxidation reaction unit 120 rather than by using an additional unit for vaporizing water according to the present exemplary embodiment, thereby reducing the number of parts and the volume of the overall apparatus.

In the fuel reforming apparatus 200 according to the second exemplary embodiment of the present invention, a flame and a combustion gas generated when the fuel and the oxidant gas are ignited by the ignition unit 130 during initial driving are injected into the third section 153 from the second section 142 through the vent holes 154, and thermal energy from an oxidation reaction of the fuel and the oxidant by an oxidation catalyst 122 when the fuel reforming apparatus 200 is normally driven is also supplied to the third section 153.

When water is passed through the pass member 155, thermal energy supplied to the third section 153 is delivered to the pass member 155 so that the water passing through the pass member 155 is vaporized by the thermal energy. The combustion gas is emitted through the second outlet port 144.

When the water is vaporized, water vapor is generated, and the water vapor is injected into a first body 111 through a first inlet port 114 of a reforming reaction unit 110. The fuel may be separately injected into the first body 111 through the first inlet port 114.

A reforming catalyst 112 generates a reformate gas from a reforming reaction of the fuel and the water vapor. The reformate gas is emitted through a first outlet port 116 of the reforming reaction unit 110.

Other constitutional features and operation of the fuel reforming apparatus 200 are the same as those of the fuel reforming apparatus of the first exemplary embodiment, and therefore, no further description thereof has been provided.

Figure 5:
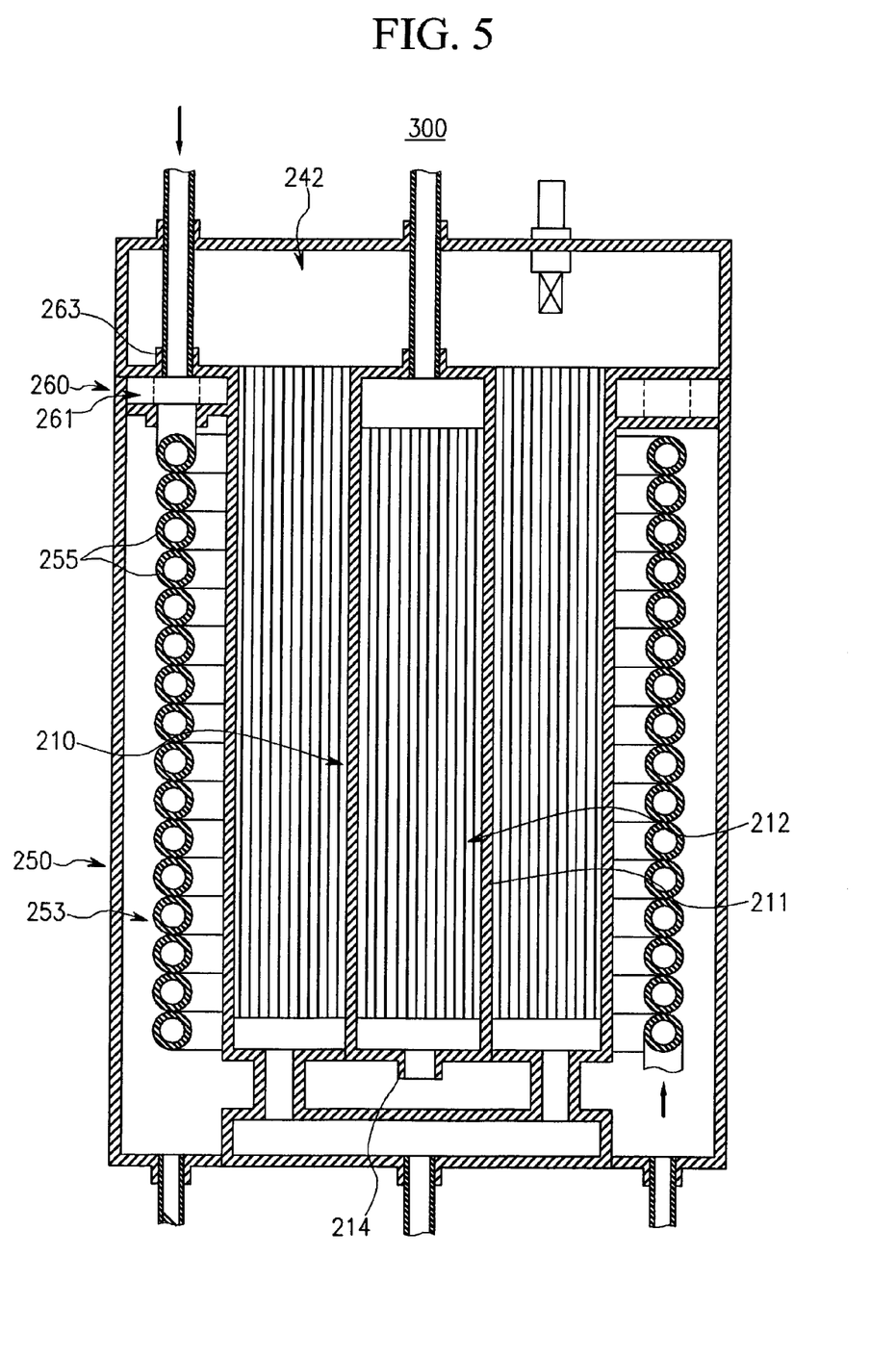
FIG. 5 is a cross-sectional view of a fuel reforming apparatus according to a third exemplary embodiment of the present invention.

FIG. 5 is a cross-sectional view of a fuel reforming apparatus according to a third exemplary embodiment of the present invention.

Referring to FIG. 5, a fuel reforming apparatus 300 according to the third exemplary embodiment of the present invention is basically the same as the fuel reforming apparatus 200 of the second exemplary embodiment of the present invention, and further includes a compounding unit 260 that compounds a fuel and water vapor and supplies the compounded fuel and water vapor to a reforming reaction unit 210.

The compounding unit 260 includes a fourth section 261 separately partitioned between a second section 242 and a water vaporizer 250, and a third inlet port 263 for injecting a fuel to the fourth section 261.

The fourth section 261 is positioned on an upper portion of the vaporizer 250, and formed as an independently partitioned space between the second section 242 and a third section 253 of the vaporizer 250.

In the present exemplary embodiment, the fourth section 261 is connected to a first end of a pass member 255, and is connected to a path of the pass member 255.

The third inlet port 263 is connected to the fourth section 261, and is connected to a pipe that penetrates the second section 242.

The fourth section 261 and a first inlet port 214 of the reforming reaction unit 210 are connected to each other through a pipe (not shown). That is, the fuel and water vapor compounded in the fourth section 261 flow through the pipe and are supplied to a first body 211 through the first inlet port 214.

Therefore, the fuel and the water vapor can be compounded by using the compounding unit 260 partitioned between the second section 242 and the vaporizer 250 rather that by using an additional device, thereby reducing the number of parts and the volume of the fuel reforming apparatus 300.

The fuel is injected to the fourth section 261 through the third inlet port 263 by operation of the fuel reforming apparatus 300 according to the third exemplary embodiment of the present invention.

Simultaneously, water vapor, vaporized from water passing through the pass member 255, is injected into the fourth section 261 and compounded with the fuel therein.

Therefore, the compounded fuel and water vapor are emitted from the fourth section 261 to flow through the pipe, and are supplied to the first body 211 through the first inlet port 214 of the reforming reaction unit 210.

The reforming reaction unit 210 generates a reformate gas from a reforming reaction of the fuel and the water vapor by a reforming catalyst 212.

Other constitutional features and operations of the fuel reforming apparatus 300 are the same as those of the fuel reforming apparatuses of the first and second exemplary embodiments, and therefore, no further description has been provided.

Figure 6:
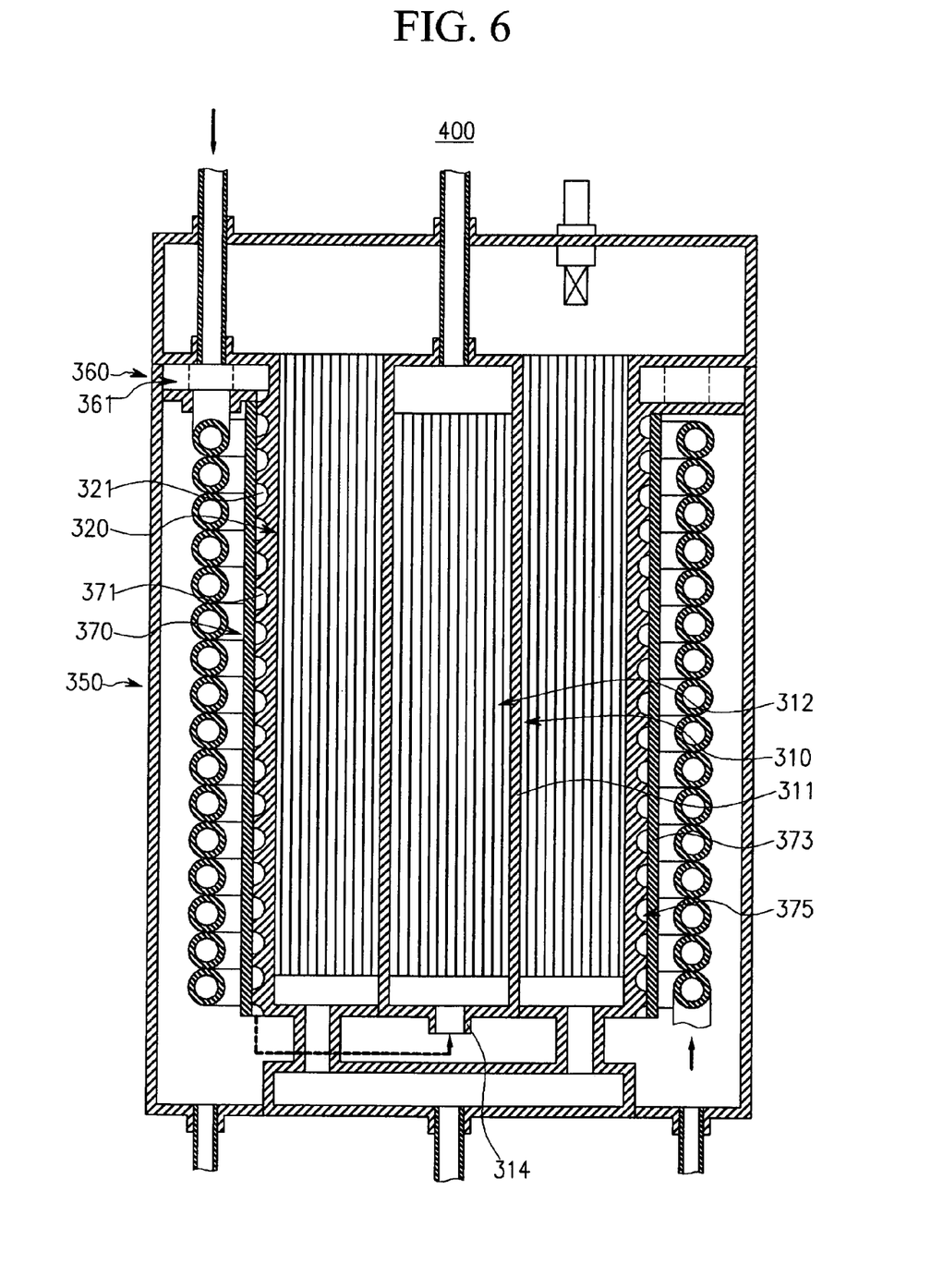
FIG. 6 is a cross-sectional view of a fuel reforming apparatus according to a fourth exemplary embodiment of the present invention.

FIG. 6 is a cross-sectional view of a fuel reforming apparatus according to a fourth exemplary embodiment of the present invention.

Referring to FIG. 6, a fuel reforming apparatus 400 according to the present exemplary embodiment is basically similar to the fuel reforming apparatus 300 of the third exemplary embodiment of the present invention, and further includes a channel unit 370 through which fuel and water vapor compounded in a compounding unit 360 are supplied to a reforming reaction unit 310.

The channel unit 370 is formed between a vaporizer 350 and an oxidation reaction unit 320. The compounded fuel and water vapor flow through the channel unit 370, and the channel unit 370 is connected to a fourth section 361 of the compounding unit 360 and a first body 311 of the reforming reaction unit 310.

In the present exemplary embodiment, the channel unit 370 includes a spiral groove 371 formed on an exterior surface of a second body 321 and a spiral path 375 formed by a pipe-type fourth body 373 that surrounds the exterior surface of the spiral path 375.

A groove 371 is formed in a spiral shape in the external surface of the second body 321, and the fourth body 373 contacts the exterior surface of the second body 321.

The spiral path 375 is formed as a channel through which a fuel and water vapor flow in a spiral shape by the groove 371 and the fourth body 373.

The reason that the path 375 is formed in a spiral shape on the exterior surface of the second body 321 is to increase a duration time of the fuel and the water vapor and to easily provide thermal energy generated from the oxidation reaction unit 320 to the fuel and the water vapor.

A first end of the path 375 is connected to the fourth section 361 of the compounding unit 360, and a second end of the path 375 is connected to a first inlet port 314 of the reforming reaction unit 310. The second end of the path 375 and the first inlet port 314 may be connected by a pipe represented by a dotted line arrow in FIG. 6.

The fuel and water vapor compounded in the compounding unit 360 flow through the path 375 in the spiral shape from the fourth section 361 as in the third exemplary embodiment by operation of the fuel reforming apparatus 400.

Therefore, the fuel and the water vapor receive thermal energy generated by the oxidation reaction unit 320 while flowing through the path 375.

The fuel and the water vapor are supplied to the first body 311 through the first inlet port 314 of the reforming reaction unit 310.

The reforming reaction unit 310 generates a reformate gas from a reforming reaction of the fuel and the water vapor by a reforming catalyst 312.

According to the fourth exemplary embodiment of the present invention, the channel unit 370 is provided to provide the thermal energy generated by the oxidation reaction unit to the fuel and water vapor so that efficiency in transmission of the thermal energy required for the reforming reaction of the fuel and water vapor can be maximized, thereby improving thermal efficiency of the overall apparatus.

Other constitutional features and operations of the fuel reforming apparatus 400 are the same as those of the fuel reforming apparatuses of the first and second exemplary embodiments, and therefore, no further description has been provided.

Figure 7:
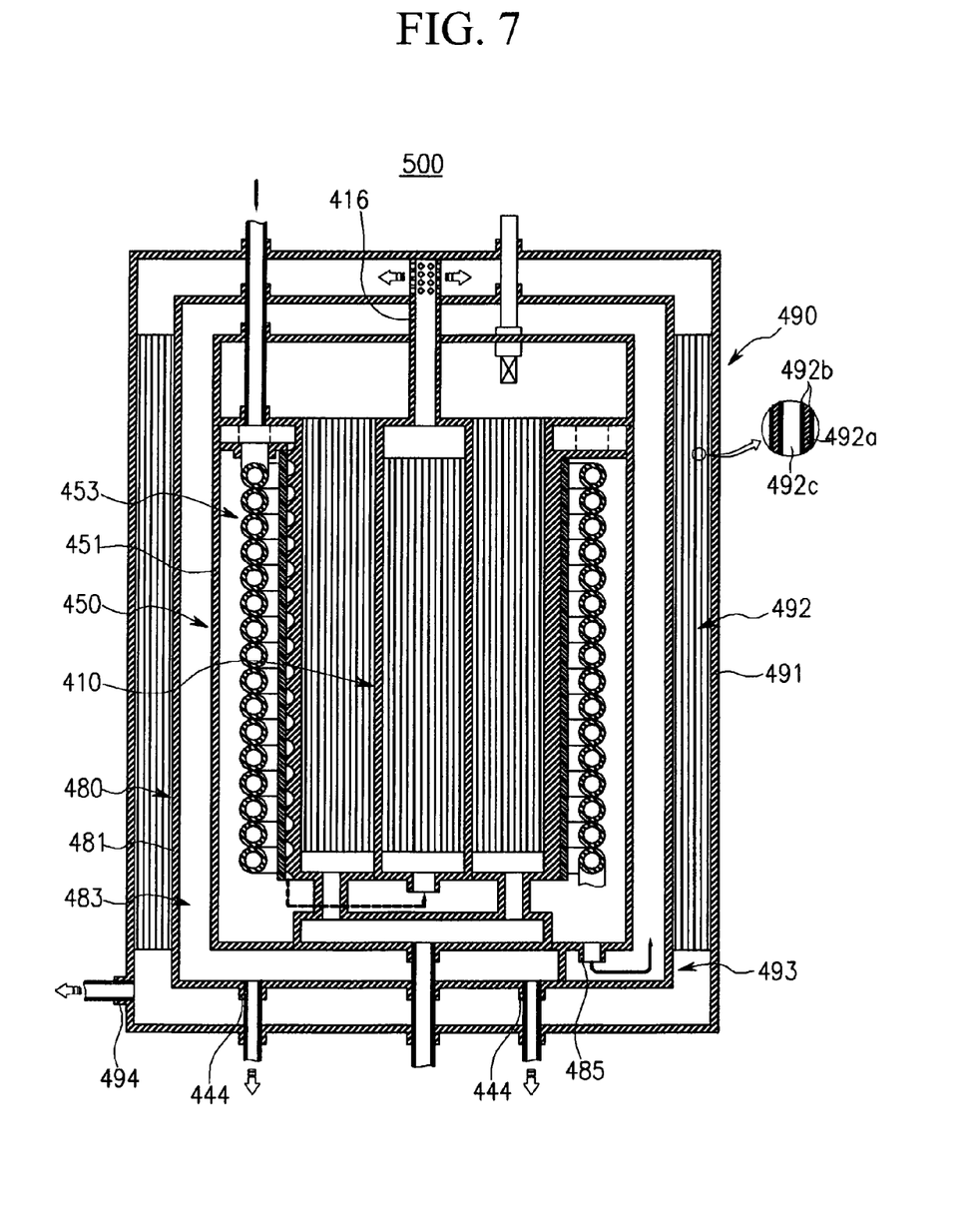
FIG. 7 is a cross-sectional view of a fuel reforming apparatus according to a fifth exemplary embodiment of the present invention.

FIG. 7 is a cross-sectional view of a fuel reforming apparatus according to a fifth exemplary embodiment of the present invention.

Referring to FIG. 7, a fuel reforming apparatus 500 according to the present exemplary embodiment is basically similar to the fuel reforming apparatuses of the previous exemplary embodiments of the present invention, and further includes a combustion gas circulation unit 480 for circulating a combustion gas of a fuel and an oxidant, and an carbon monoxide reducing unit 490 for reducing carbon monoxide in a reformate gas generated by a reforming reaction unit 410.

In the present exemplary embodiment, the combustion gas circulation unit 480 circulates a combustion gas of the fuel and the oxidant that has passed through a vaporizer 450 and supplies thermal energy of the combustion gas to the carbon monoxide reducing unit 490.

The combustion gas circulation unit 480 includes a fifth body 481 surrounding a third body 451 of the vaporizer 450 and a fifth section 483 formed between the third body 451 and the fifth body 481 by the fifth body 481.

The fifth body 481 is formed in a shape that houses the fuel reforming apparatus 400 of the fourth exemplary embodiment. The fifth body 481 is a cylindrically-shaped pipe having a larger line area that the third body 451.

The third body 451 is arranged in an internal center direction (coaxial direction) of the fifth body 481 so that an exterior surface of the third body 451 is constantly spaced from an interior surface of the fifth body 481.

The fifth section 483 is formed as a closed space between the third body 451 and the fifth body 481 by the fifth body 481.

The fifth section 483 is connected to a third section 453 of the vaporizer 450. At a first end (lower portion of the third body 451 in FIG. 7) of the third body 451, at least one vent hole 485 is formed for connecting the third section 453 to the fifth section 483.

Therefore, the combustion gas of the fuel and the oxidant that is introduced into the third section 453 is circulated to the fifth section 483 through the vent hole 485.

The combustion gas circulated to the fifth section 483 can be emitted through a plurality of second outlet ports 444 formed at a first end (lower portion of the fifth body 481 in FIG. 7) of the fifth body 481.

As described, the fuel reforming apparatus 500 according to the fifth exemplary embodiment includes the combustion gas circulation unit 480 for circulating the combustion gas of the fuel and the oxidant so that thermal energy of the combustion gas can be supplied to the carbon monoxide reducing unit 490 and preheat the carbon monoxide reducing unit 490 to a reaction initiation temperature.

In the present exemplary embodiment, the carbon monoxide reducing unit 490 receives a reformate gas (hereinafter referred to as a first reformate gas) generated by the reforming reaction unit 410, and generates a reformate gas (hereinafter referred to as a second reformate gas) having carbon monoxide reduced in concentration by a Water Gas Shift (WGS) of carbon monoxide contained in the first reformate gas.

The carbon monoxide reducing unit 490 includes a sixth body 491 surrounding the fifth body 481 and a Water Gas Shifting (WGS) catalyst 492 formed between the fifth body 481 and the sixth body 491.

The sixth body 491 is a cylindrically-shaped pipe having a larger line area than that of the fifth body 481. The sixth body 491 houses the fifth body 481, except for the lower portion of the fifth body 481 as shown in FIG. 7.

The fifth body 481 is arranged in an internal center direction (coaxial direction) of the sixth body 491 so that an exterior surface of the sixth body 491 is constantly spaced from an interior surface of the sixth body 491. That is, a sixth section 493 is formed between the fifth body 481 and the sixth body 491 for accommodating the water gas shifting catalyst 492.

The WGS catalyst 492 promotes a WGS reaction of the carbon monoxide. The WGS catalyst 492 includes a monolithic third catalyst molding frame 492a and a third catalyst layer 492b coated on the third catalyst molding frame 492a.

The third catalyst molding frame 492a is provided in the sixth section 493, and is manufactured as an integral module by extrusion molding of a ceramic or metal material. The third catalyst molding frame 492a forms a plurality of honeycomb-shaped third paths 492c that are parallel with a flowing direction of the first reformate gas.

The third catalyst layer 492b is coated on an inner wall of the third path 492c of the third catalyst molding frame 492a. Such a third catalyst layer 492b is made of a typical catalyst material that can promote the WGS reaction of the carbon monoxide, for example, copper (Cu), zinc (Zn), iron (Fe), or chromium (Cr).

The reforming reaction unit 410 includes a first outlet port 416 for emitting the first reformate gas, and the first outlet port 416 is connected to the sixth section 493.

The carbon monoxide reducing unit 490 forms a second outlet port 494 for emitting the second reformate gas. The second outlet port 494 is formed in the sixth body 492 to as to be connected to the sixth section 493.

The combustion gas of the fuel and the oxidant introduced in the third section 453 of the vaporizer 450 is circulated to the fifth section 483 through the vent hole 485 as in the second exemplary embodiment of the present invention by operation of the fuel reforming apparatus 500 according to the fifth exemplary embodiment of the present invention.

The carbon monoxide reducing unit 490 receives the thermal energy of the combustion gas circulated to the fifth section 483, and is preheated to a reaction initiation temperature of, for example, 230 to 280° C.

In the above processes, the first reformate gas generated by the reforming reaction unit 410 is emitted through the first outlet port 416 and introduced into the sixth section 493 since the first outlet port 416 is connected to the sixth section 493.

Therefore, the carbon monoxide reducing unit 490 reduces the concentration of the carbon monoxide as the WGS reaction of the carbon monoxide in the first reformate gas is accelerated by the WGS catalyst 492.

The second reformate gas having carbon monoxide reduced in concentration is emitted through the second outlet port 494. The second reformate gas is supplied to a fuel cell through an additional pipe.

Other constitutional features and operation of the fuel reforming apparatus 500 are the same as those of the fuel reforming apparatuses of the previous exemplary embodiments, and therefore, no further description has been provided.

Figure 8:
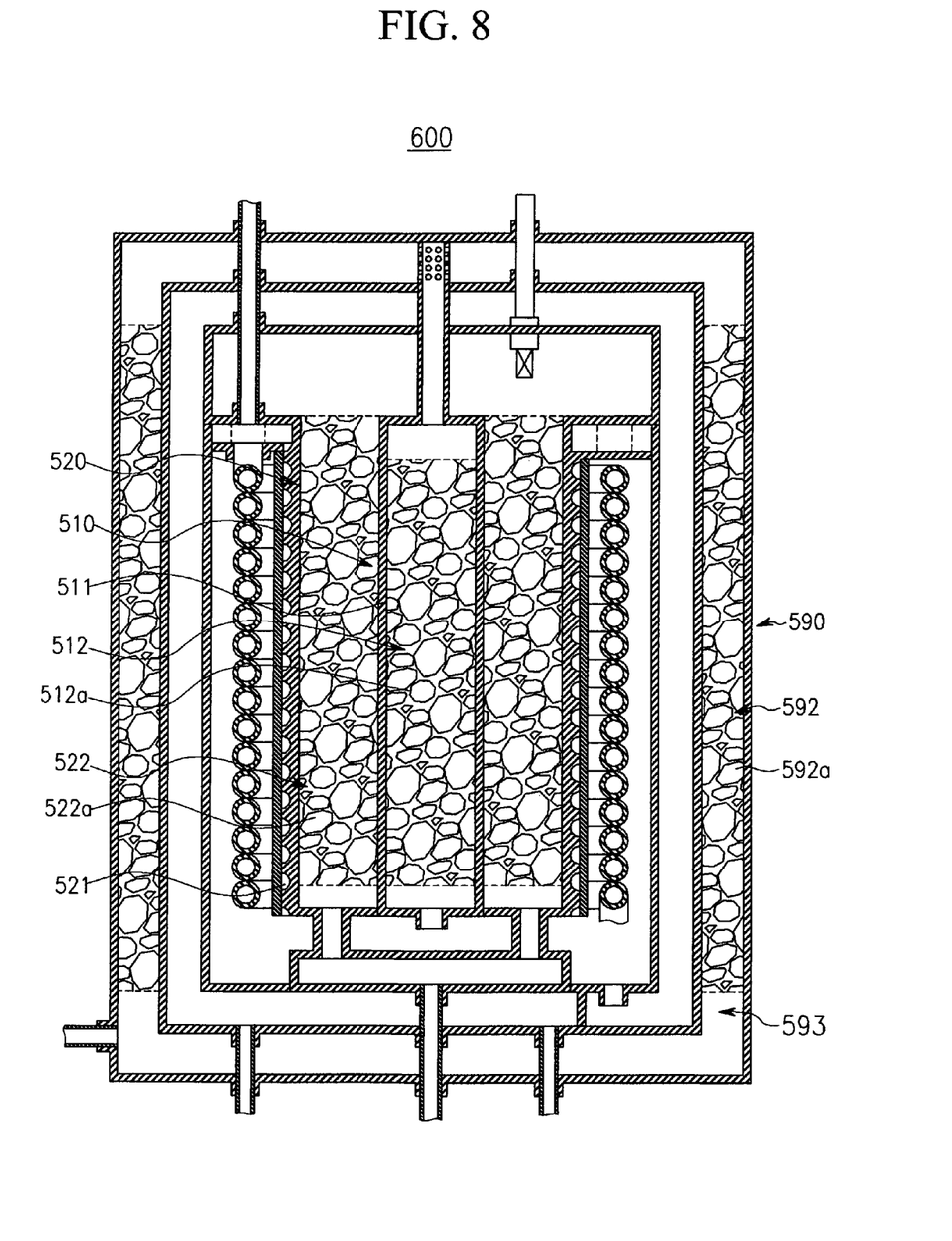
FIG. 8 is a cross-sectional view of a fuel reforming apparatus according to a sixth exemplary embodiment of the present invention.

FIG. 8 is a cross-sectional view of a fuel reforming apparatus according to a sixth exemplary embodiment of the present invention.

Referring to FIG. 8, a fuel reforming apparatus 600 according to the sixth exemplary embodiment of the present invention is basically similar to those of the previous exemplary embodiments, except that a reforming catalyst 512, an oxidation catalyst 522, and a WGS catalyst 592 may respectively compose a reforming reaction unit 510, an oxidation reaction unit 520, and a carbon monoxide reducing unit 590 which are formed with pellet-type unit catalysts.

That is, the reforming catalyst 512 is formed of unit catalysts 512a filled in a first body 511 of the reforming reaction unit 510, the oxidation catalyst 522 is formed of oxidation catalysts 522a filled in an area between the first body 511 and a second body 521, and the WGS catalyst 592 is formed of unit catalysts 592a filled in a sixth section 593.

These unit catalysts 512a, 522a, and 592a are formed in a structure where a catalyst material is coated over the surface of a predetermined supporting member that is made of alumina.

Other constitutional features and operations of the fuel reforming apparatus 600 are the same as those of the fuel reforming apparatuses of the previous exemplary embodiments, and therefore, no further description has been provided.

Figure 9:
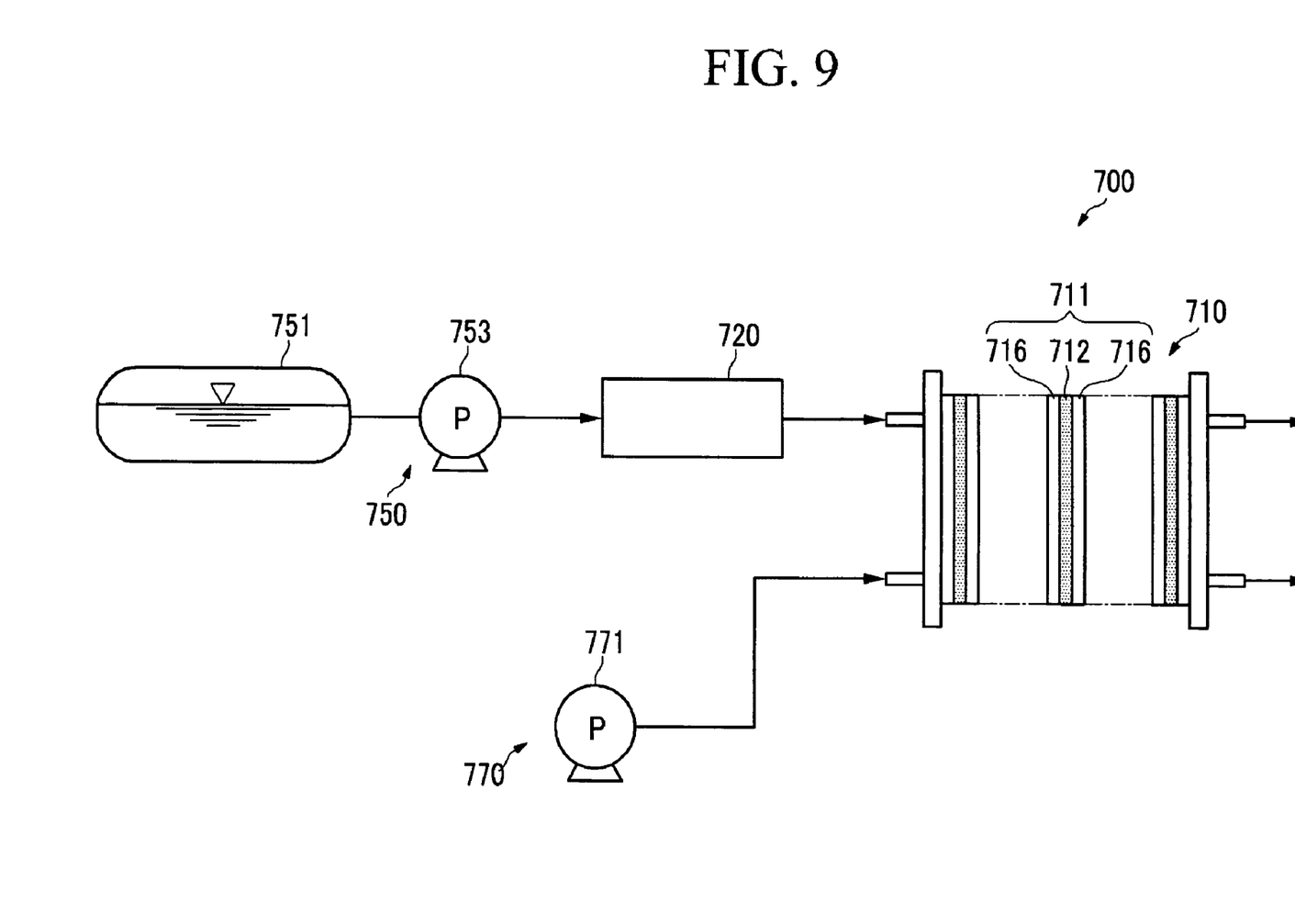
FIG. 9 is a schematic block diagram of a fuel cell system having a fuel reforming apparatus according to an exemplary embodiment of the present invention.

FIG. 9 is a schematic block diagram of a fuel cell system having a fuel reforming apparatus according to an exemplary embodiment of the present invention.

Referring to FIG.9, the fuel cell system 700 generates are forming gas containing hydrogen by reforming a fuel and generates electrical energy through an oxidation reaction of the reforming gas and the reduction reaction of an oxidant gas.

The oxidant gas used for the fuel cell system 700 may be oxygen stored in a separate storage means. Alternatively, air containing oxygen may be used as the oxidant gas.

The fuel cell system 700 includes a stack 710 for generating electrical energy through a reaction of hydrogen and oxygen, a fuel reforming apparatus 720 for generating a reforming gas by reforming the fuel and supplying the reforming gas to the stack 710, a fuel supply unit 750 for supplying the fuel to the fuel reforming apparatus 720, and an oxygen supply unit 770 for supplying the oxygen to the stack 710.

The stack 710 includes electricity generators 711 which are connected to the fuel reforming apparatus 720 and the oxygen supply unit 770. The electricity generators 711 receive the reforming gas from the fuel reforming apparatus 720 and the oxygen from the oxygen supply unit 770 to generate electrical energy through a reaction of the hydrogen and oxygen. The electricity generators 711 are provided in cell units, and therefore, a plurality of electricity generators 711 are sequentially disposed to form the stack 710 as a stacked structure of the electricity generators 711.

The electricity generator 711 constitutes a minimum unit of a fuel cell, in which separators 716 are disposed in close contact with both surfaces of a membrane assembly 712.

Since the stack 710 can be constructed as a stack of conventional polymer electrolyte membrane fuel cells, a detailed description thereof has been omitted. The fuel reforming apparatus 720 maybe one of the above-described fuel cell reforming apparatus.

A fuel supply unit 750 for supplying a fuel to the fuel reforming apparatus 720 includes a fuel tank 751 for storing the fuel and a fuel pump 753 for discharging the fuel stored in the fuel tank 751.

The oxygen supply unit 70 includes an air pump 771 for sucking air and supplying the air to the electricity generator 711 of the stack 710 with a predetermined pumping pressure. The oxygen supply line 770 is not limited to the aforementioned air pump 771, but the oxygen supply unit 770 may instead comprise a fan having a conventional structure.

According to the above-described exemplary embodiments of the present invention, the oxidation catalyst can be heated at the initial driving stage of the fuel reforming apparatus so that power required for the initial driving can be reduced, thereby improving driving efficiency of the overall apparatus.

In addition, according to the exemplary embodiments of the present invention, a flame is quickly transmitted to the oxidation catalyst so that an initial driving time of the fuel reforming apparatus can be reduced.

In addition, according to the exemplary embodiments of the present invention, damage to the oxidation catalyst due to the flame can be reduced unlike the conventional fuel reforming apparatus, and the thermal gradient and durability of the oxidation reaction unit are more improved, thereby increasing life-cycle of the overall apparatus.

Furthermore, an additional preheating apparatus is not required according to the exemplary embodiments of the present invention so the fuel reforming apparatus can have a simple structure with reduced volume.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A fuel reforming apparatus comprising:
an oxidation reaction unit including an oxidation catalyst;
a reforming reaction unit having an inlet for the flow of fuel and air into the reforming reaction unit and an outlet for the flow of reformate gas out of the reforming reaction unit, the reforming reaction unit including a reforming catalyst between the inlet and the outlet; and
an ignition unit to ignite a hydrocarbon-containing fuel and an oxidant and to preheat the oxidation catalyst;
wherein the oxidation reaction unit includes a first section and a second section respectively arranged opposite to each other with the oxidation catalyst interposed therebetween and facilitates a stream of the fuel and the oxidant flowing to the second section through the oxidation catalyst from the first section,
wherein the reforming reaction unit is surrounded by the oxidation reaction unit, and
wherein the ignition unit is arranged in the second section such that a flame generated as a result of igniting the fuel and oxidant in the second section is diffused in a direction which is opposite to the direction of flow of fuel and oxidant from the first to the second section, the reforming reaction unit being arranged such that fuel and air injected through the inlet flows through the reforming catalyst in the reforming reaction unit to the outlet in the same direction as the fuel and oxidant that enters the first section and flows to the second section over the oxidation catalyst.

2. The fuel reforming apparatus of claim 1, wherein the ignition unit ignites the fuel and the oxidant using an electrical spark in the second section.

3. The fuel reforming apparatus of claim 1, wherein the oxidation reaction unit generates thermal energy from an oxidation reaction of the fuel and the oxidant by the oxidation catalyst.

4. The fuel reforming apparatus of claim 3, wherein the reforming reaction unit receives the thermal energy and generates a reformate gas containing hydrogen from a reforming reaction of the fuel and water vapor by the reforming catalyst.

5. A fuel reforming apparatus comprising:
a reforming reaction unit having an inlet for the flow of fuel and air into the reforming reaction unit and an outlet for the flow of reformate gas out of the reforming reaction unit, the reforming reaction unit including a first catalyst and a reforming catalyst arranged in a first body between the inlet and the outlet, the reforming reaction unit generating a reformate gas containing hydrogen from a reforming reaction of a hydrocarbon-containing fuel and water vapor using the reforming catalyst;
an oxidation reaction unit having a second body surrounding the first body and an oxidation catalyst arranged between the first body and the second body, the oxidation reaction unit generating thermal energy from an oxidation reaction of the hydrocarbon-containing fuel and an oxidant using the oxidation catalyst, and supplying the thermal energy to the reforming reaction unit; and
an ignition unit to produce a flame to preheat the oxidation catalyst to a reaction initiation temperature;
wherein the oxidation reaction unit has a first section and a second section respectively connected to lateral ends of the second body and connected to an area located between the first and second bodies,
wherein the reforming reaction unit is surrounded by the oxidation reaction unit, and
wherein the ignition unit is arranged in the second section such that the flame generated as a result of igniting the fuel and oxidant in the second section is diffused in a direction which is opposite to the direction of flow of fuel and oxidant from the first to the second section through the oxidation catalyst, the reforming reaction unit being arranged such that fuel and air injected through the inlet flows through the reforming catalyst in the reforming reaction unit to the outlet in the same direction as the fuel and oxidant that enters the first section and flows to the second section over the oxidation catalyst.

6. The fuel reforming apparatus of claim 5, wherein the first body and the second body are respectively shaped as a pipe, and wherein the first body is arranged within the second body.

7. The fuel reforming apparatus of claim 5, wherein the reforming catalyst and the oxidation catalyst are respective monolithic supporting members on which a catalyst material is coated.

8. A fuel reforming apparatus comprising:
a reforming reaction unit including a first catalyst and a reforming catalyst arranged in a first body, the reforming reaction unit generating a reformate gas containing hydrogen from a reforming reaction of a hydrocarbon-containing fuel and water vapor using the reforming catalyst;
an oxidation reaction unit having a second body surrounding the first body and an oxidation catalyst arranged between the first body and the second body, the oxidation reaction unit generating thermal energy from an oxidation reaction of the hydrocarbon-containing fuel and an oxidant using the oxidation catalyst, and supplying the thermal energy to the reforming reaction unit; and
an ignition unit to produce a flame to preheat the oxidation catalyst to a reaction initiation temperature; and
a vaporizer having a cylinder shaped third body surrounding the second body, the vaporizer vaporizing water with the thermal energy received from the oxidation reaction unit
wherein the oxidation reaction unit has a first section and a second section respectively connected to lateral ends of the second body and connected to an area located between the first and second bodies;
wherein the ignition unit is arranged in the second section;
wherein a stream of the fuel and the oxidant flows to the second section from the first section through the oxidation catalyst, and
wherein the flame is diffused in a direction opposite to a direction of the stream of the fuel and the oxidant.

9. The fuel reforming apparatus of claim 8, wherein the vaporizer comprises:
a third section arranged between the second body and the third body and connected to the second section; and
a coil shaped pass member arranged along an exterior surface direction of the second body in the third section and transporting the water.

10. The fuel reforming apparatus of claim 8, further comprising a fourth section arranged separately between the second section and the vaporizer, and a compounding unit to compound the fuel and water vapor in the fourth section.

11. The fuel reforming apparatus of claim 10, wherein the compounding unit comprises a fuel inlet port for introducing the fuel into the fourth section.

12. The fuel reforming apparatus of claim 10, wherein the vaporizer comprises a coil shaped pass member arranged in a third section arranged between the second body and the third body, and wherein the compounding unit comprises a fuel inlet port for introducing the fuel to the fourth section, the pass member being connected to the fourth section.

13. The fuel reforming apparatus of claim 10, further comprising a channel unit arranged between the vaporizer and the oxidation reaction unit, the channel unit supplying the fuel and water vapor compounded by the compounding unit to the reforming reaction unit.

14. The fuel reforming apparatus of claim 13, wherein the channel unit comprises a spiral groove arranged on an exterior surface of the second body and a spiral path arranged as a pipe-type fourth body surrounding the exterior surface of the second body.

15. The fuel reforming apparatus of claim 14, wherein the spiral path is connected to the compounding unit and the reforming reaction unit.

16. The fuel reforming apparatus of claim 8, further comprising a combustion gas circulation unit having a pipe-type fifth body surrounding the third body, the combustion gas circulation unit circulating a combustion gas of the fuel and the oxidant transported through the third section.

17. The fuel reforming apparatus of claim 16, wherein the combustion gas circulation unit is arranged between the third body and the fifth body and is arranged as a fifth section connected to the third section.

18. The fuel reforming apparatus of claim 16, wherein the combustion gas circulation unit comprises a combustion gas outlet port to emit the combustion gas.

19. The fuel reforming apparatus of claim 5, wherein the fuel reforming apparatus uses a liquefied gas that transforms into a gaseous state at room temperature as the hydrocarbon-containing fuel.

20. The fuel reforming apparatus of claim 19, wherein the hydrocarbon-containing fuel comprises at least one of methane, ethane, propane, and butane.

21. A method of driving a fuel reforming apparatus, the driving method comprising:
providing the oxidation reaction unit, the reforming reaction unit, and the ignition unit of claim 5;
forming a stream of a fuel and an oxidant past an oxidation catalyst and flowing to a second section from a first section so as to preheat the oxidation catalyst of the oxidation reaction unit;
activating the ignition unit;
forming a flame by combusting the fuel and the oxidant in the second section using the ignition unit; and
introducing the flame in a direction that is opposite to the stream direction of the fuel and the oxidant.

22. The method of claim 21, wherein the ignition unit is turned off when the oxidation catalyst has been preheated to a temperature of over 250° C.

23. The method of claim 21, wherein a temperature of the oxidation reaction unit is maintained at 650 to 700° C.

24. The method of claim 23, wherein the oxidation reaction unit generates thermal energy from an oxidation reaction of the fuel and the oxidant by the oxidation catalyst.

25. A fuel cell system comprising:
a stack to generate electric energy through a reaction between hydrogen and oxygen; and
a fuel reforming apparatus to generate hydrogen from fuel through a catalytic reaction of the fuel using thermal energy and to supply the generated hydrogen to the stack;
wherein the fuel reforming apparatus comprises;
an oxidation reaction unit including an oxidation catalyst;
a reforming reaction unit having an inlet for the flow of fuel and air into the reforming reaction unit and an outlet for the flow of reformate gas out of the reforming reaction unit, the reforming reaction unit including a reforming catalyst between the inlet and the outlet; and
an ignition unit to ignite a hydrocarbon-containing fuel and an oxidant and to preheat the oxidation catalyst;
wherein the oxidation reaction unit includes a first section and a second section respectively arranged opposite to each other and the oxidation catalyst interposed therebetween, the oxidation reaction unit producing a stream of the fuel and the oxidant flowing to the second section through the oxidation catalyst from the first section,
wherein the reforming reaction unit is surrounded by the oxidation reaction unit, and
wherein the ignition unit is arranged in the second section such that a flame generated as a result of igniting the fuel and oxidant in the second section is diffused in a direction which is opposite to the direction of flow of fuel and oxidant from the first to the second section, the reforming reaction unit being arranged such that fuel and air injected through the inlet flows through the reforming catalyst in the reforming reaction unit to the outlet in the same direction as the fuel and oxidant that enters the first section and flows to the second section over the oxidation catalyst.

* * * * *